June 8, 1965 R. H. LAZINSKI 3,187,624

RECORD SYSTEM INCLUDING RECORD STORAGE MEANS AND NEGATIVE FILM PROJECTING APPARATUS FOR RAPID UTILIZATION OF INTELLIGENCE

Filed July 11, 1961

3 Sheets-Sheet 1

INVENTOR.
RAYMOND H. LAZINSKI
BY
F. D. Porter
ATTORNEY

June 8, 1965

R. H. LAZINSKI 3,187,624

RECORD SYSTEM INCLUDING RECORD STORAGE MEANS AND NEGATIVE FILM PROJECTING APPARATUS FOR RAPID UTILIZATION OF INTELLIGENCE

Filed July 11, 1961

3 Sheets-Sheet 2

INVENTOR.
RAYMOND H. LAZINSKI
BY
F. D. Prager
ATTORNEY

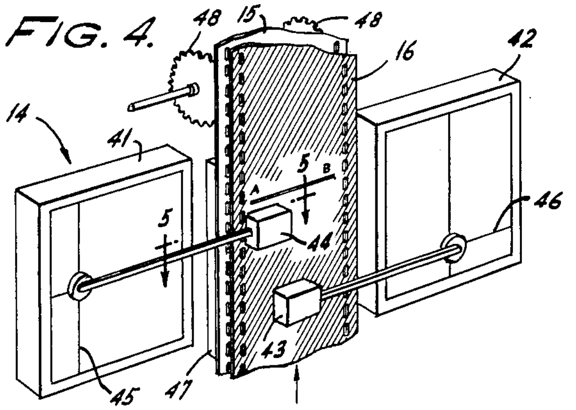
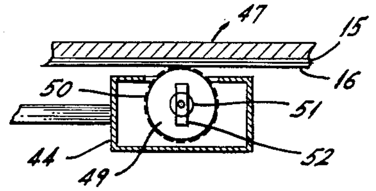
FIG. 5.
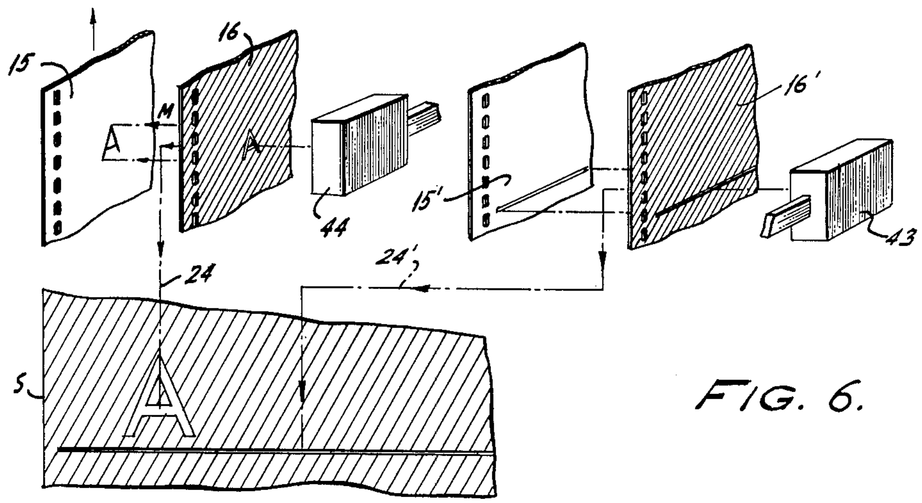
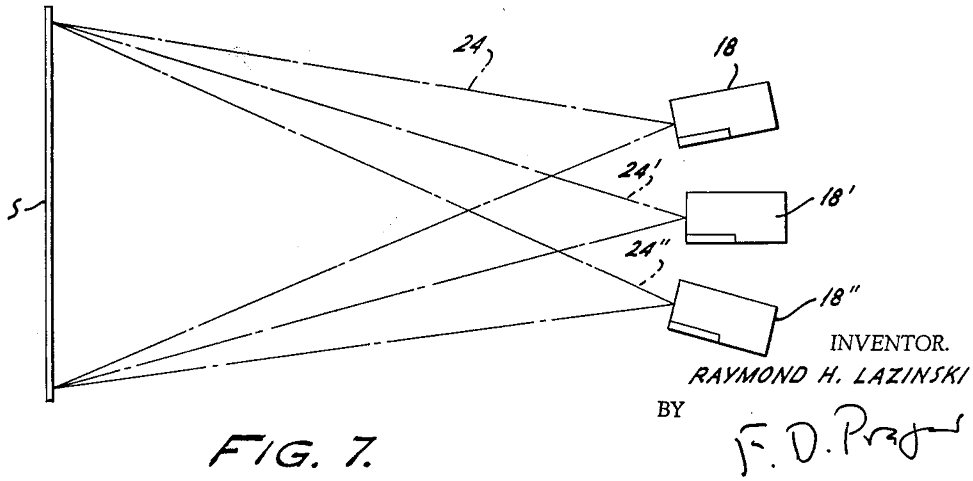
FIG. 7.
INVENTOR.
RAYMOND H. LAZINSKI
BY F. D. Prager
ATTORNEY 3,187,624
Patented June 8, 1965

3,187,624

RECORD SYSTEM INCLUDING RECORD STORAGE MEANS AND NEGATIVE FILM PROJECTING APPARATUS FOR RAPID UTILIZATION OF INTELLIGENCE

Raymond H. Lazinski, Glenside, Pa., assignor, by mesne assignments, to Philco Corporation, Philadelphia, Pa., a corporation of Delaware Filed July 11, 1961, Ser. No. 123,233
2 Claims. (Cl. 88—24)

Figure 1:
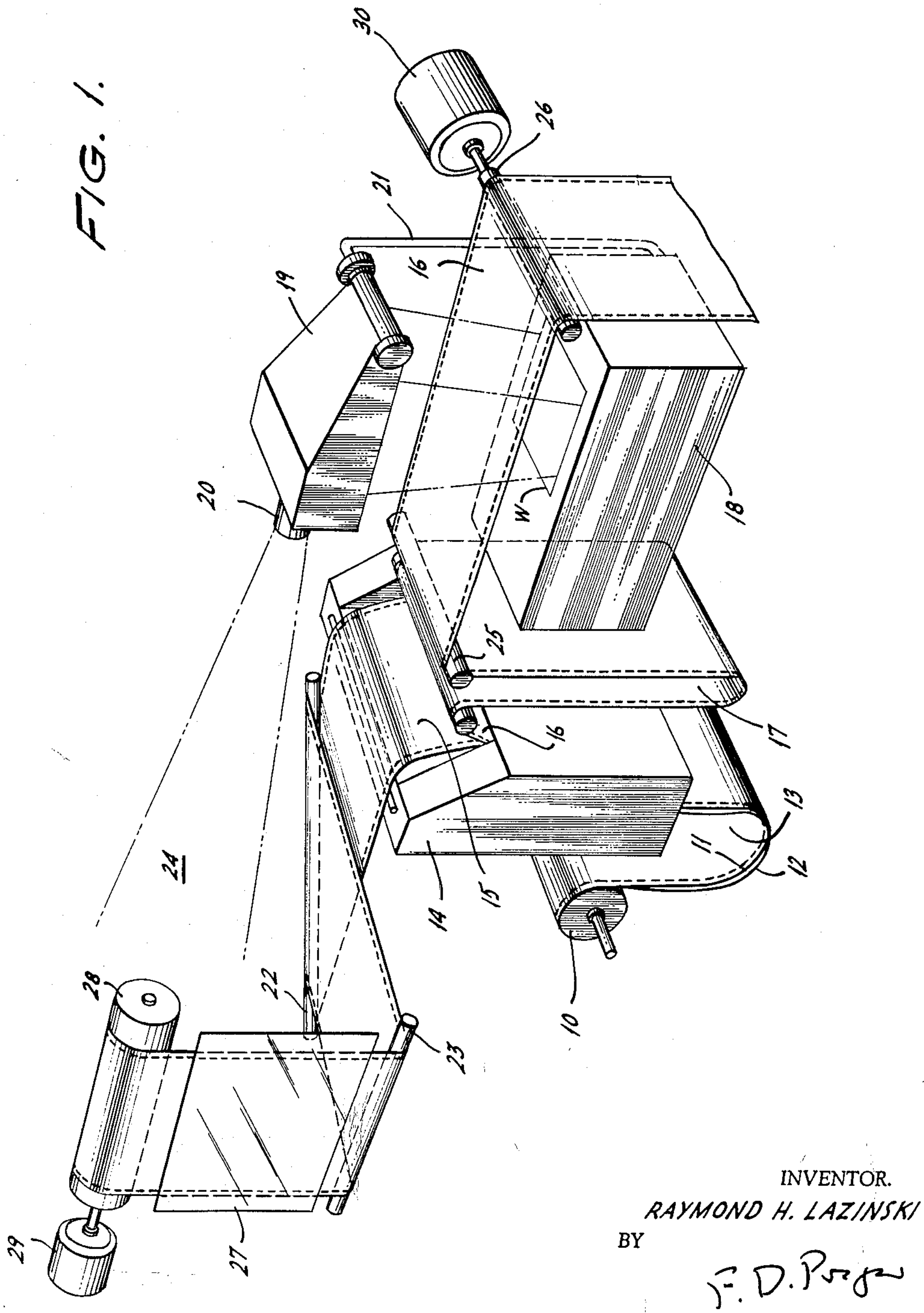

This invention relates to a method of and machine for receiving messages, graphic data and other intelligence and for thereupon making the received data and other intelligence directly available for various forms of utilization and reference.

Devices of the indicated type are used for instance in airport control centers and in other operations both civil and military, where information and intelligence are constantly or intermittently received. In many cases the intelligence or data must be made available to numbers of observers for immediate inspection, and must also be kept as a permanent record. Heretofore machines of this type have been capable only of partially satisfactory operation with regard to the quality of the combined projecting and recording afforded by them.

It is a basic object of the invention to improve the machine in this respect.

A record, convenient for future reference, is desirably formed and kept on white paper or the like, whereas in optical projection it is usualy best to utilize a transparent base or film with an opaque layer thereon and with transparent or translucent areas in such layer. The data can be represented either by opaque areas (in "positive film" projectors) or by transparent or translucent areas (in "negative film" projectors).

Heretofore, the design of a combination projector-recorder has usualy been based on compromise between the requirements of optimum record-keping on the one hand and optimum projection on the other. Some of the machines were able to keep an excellent record of written, printed and graphic data, while projecting the same data with less clarity than a separate projector affords. Other machines have projected the data with high precision, while making permanent records of only passable quality. It will also appear from the disclosure which follows that eariler combination machines of the indicated type (including mainly those with "positive film" projectors) were only of limited utility when attempts were made to use a plurality of such machines for projection of multiple data on a single screen; the light projected by one such machine tended to disturb the projection of data by another machine. It has long been desired to overcome such limitations and to provide a unitarily operable system of recorder-projectors, giving assured identity of projected and recorded materials and also giving high quality and resolution in the presentation of projected data, be it simple or complex.

It is accordingly an object of this invention to provide a machine which combines recording and projecting means in a very simple way and which yet performs as a recording device and also as a projector, with that degree of precision, flexibility, and general effectiveness which has heretofore been available only by the use of individual and separate machines. It is a further object to provide a system of such machines, performing these several functions and facilitating unitary projection of multiple data on a single screen.

The desired improvement has been achieved by providing a recording and projecting machine with novel means for the manipulation of initialy combined, subsequently separated components of an elongate, multiple web including a coated film-like transfer material and a more or less conventional record surface. A recording and film-preparing section of the machine receives this multiple web, whereonto it types or otherwise impact-prints or transfers the received intelligence or data by the transfer of coating material, such as carbon, from the film-like constituent of the web. The machine then separates the materials or strips of this web; it moves the record paper along a predetermined path at the end of which the paper is stored, for instance as a roll; and in accordance with the invention it moves the transfer material or film along a different path, including the film-projecting section of the machine. This latter section projects light through the impacted areas of the film material, wherefrom the coating material has been transferred to the record paper. The new arrangement has particular advantages in conjunction with the use of plural projectors, as will be explained hereinafter.

Figure 2:
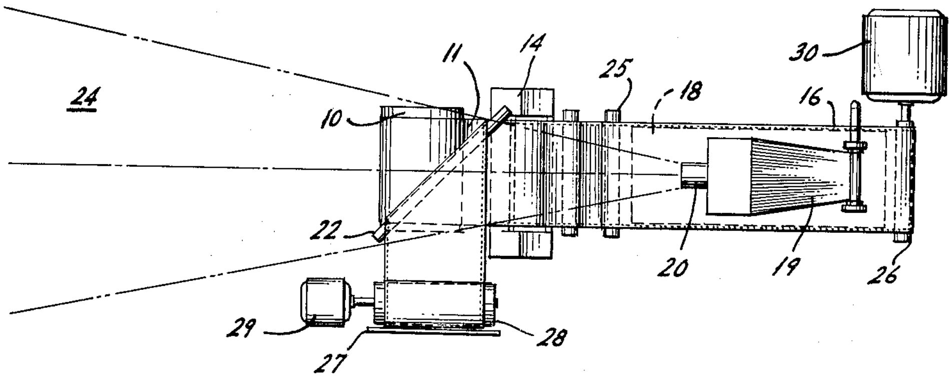

This new arrangement can be embodied in a variety of machine structures, one of which is shown in schematic perspective in FIGURE 1. A plan view and a side view of the machine are given in FIGURES 2 and 3 respectively. FIGURE 4 is a highly schematic representation of a structure provided within a detail portion of FIGURE 1, and FIGURE 5 is a detail view, taken along line 5—5 in FIGURE 4 and drawn on a larger scale. FIGURE 6 is another schematic representation of the combined carbon transferring and carbon film projecting operations performed by the machine; and FIGURE 7 is a simplified plan view showing a combination of several machines of the present type, for the projection of a combination image onto a single screen.

Figure 3:
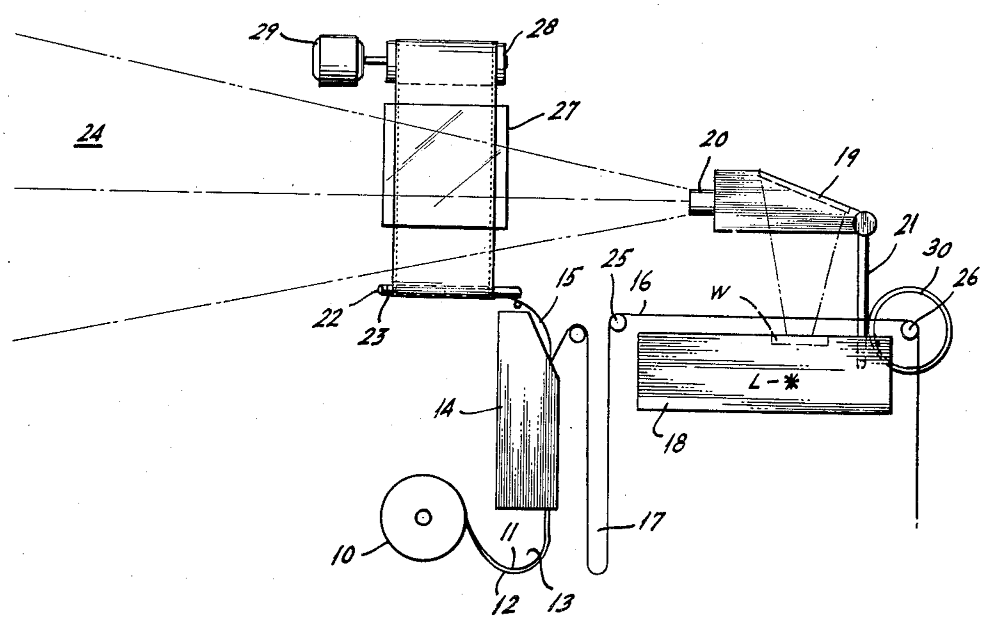

As indicated in FIGURE 1 a supply roll 10 furnishes a combined web of record paper 11 and carbon material 12—arranged in confronting face-to-face relation—by way of a suitable loop 13 in said combined web, into a printing and film preparing unit 14. The record paper (11) emerges as imprinted paper 15, while carbon material (12) separately emerges as a film 16, with small areas of the carbon coating removed therefrom by the impacting operation which has transferred such material to paper 15 (FIGURE 6). The transfer material then passes, via loop 17 therein, to and over a projecting table 18 which contains a suitable light source L (FIGURE 3). Light from this source passes through a suitable window W and then through the transparent points, lines, and imprint areas, formed on the carbon film in printer 14. The light is then suitably re-directed by reflector 19 and focussing projector optics 20. These light-directing and focussing elements 19, 20 of the projector are suitably disposed above the table or light source unit 18, by a post or standard 21.

Guide rollers 22, 23 direct the record paper 15, emerging from printer 14 (FIGURE 1), away from the light cone 24 which emerges from projector optics 20. Separate rollers 25, 26 guide the film 16 over table 18 below the reflector and focusing unit 19, 20. The arrangement of this unit and of its rollers 25, 26 is such that the thin and somewhat delicate film 16 of used carbon material is guided in directions longitudinal of such material, and thus without danger of distortion or crumpling, over the projector window W and to the point of disposal.

Meanwhile the more rugged imprinted paper strip 15 is bent and guided out of the region of projector light cone 24. The latter strip then passes through an inspection area 27 and onto a take-up and storage roll 28, that roll being driven by a motor 29. Feeding of the carbon material film, through projector unit 18, 19, 20, is effected by a motor 30 connected to roller 26.

It is believed unnecessary herein to illustrate the electric circuits and control devices for the several motors, the similar associated units which may serve for instance to rotate supply roll 10, and the details of sprocket mechanisms or equivalent devices which serve to propel the film and the paper.

The printing unit 14 can be constructed and operated in any one of several ways. The basic mechanism of this unit is schematically shown in FIGURE 4 as including a printing device 41 to print letters and other typographical or "alpha-numerical" matter, and a facsimile or line-tracing device 42. The printing and facsimile devices are equipped respectively with lettering and line-tracing heads 43, 44. These recording heads can move over the combined web 15, 16 in unit 14, the positioning of the heads being controlled in a way known by itself, for instance with the aid of coordinate control means 45, 46. Simultaneously, the combined web 15, 16 is moved between the recording heads 43, 44 and a backing plate 47 by means of sprocket rollers 48.

As further shown in FIGURE 5, printing head 43 contains a type wheel 49 with types 50 thereon, this wheel being under the control of a rotor device 51 to expose the required types in suitable succession and of a printing device 52 to print each exposed type on web 15, 16.

As suggested in FIGURE 6, the recording operation, performed by this mechanism in head 44, includes a mechanical transfer M of carbon material from film 16 to paper 15, this transfer of carbon material being performed to produce, in effect, a data record on paper 15, indicated by the black letter A, and an identical but "negative" data record on film 16, represented by the white letter A.

Light is then directed through this negative record, forming light cone 24 and thereby optically transferring the data from film 16 onto screen S.

By virtue of the use of carbon film 16, with carbon transferred therefrom to form a "negative" record, it is also possible—as indicated in the right hand portion of FIGURE 6 and in FIGURE 7—to superimpose a plurality of projection cones 24, 24', etc. coming from corresponding recording and projecting units, like those suggested by numerals 18, 18', 18'' and thereby to form on screen S a composite image. This is suggested by the letter A and the horizontal line, both shown in area S of FIGURE 6.

Moreover, this projection can take place either in daylight or in a darkened room. Typical record or intelligence data, such as letters of written material or lines of a graph, are projected as small, bright areas, on a background not illuminated by the machine. While an amount of daylight, falling on the projection screen, of course presents a certain impairment of the contrast available by such operation, the results are vastly better than in the case of projection of a "positive" film, the letters and characters of which would be surrounded by the glare of any daylight illumination and also by that of large amounts of light passing through the wide transparent areas of such film.

Any desired magnification can be used in the projecting arrangement which has been described. Thus it is possible to employ a screen S of such size as to allow viewing by the desired number of observers.

The described operation has become possible by means of the new combination of web-manipulating, recording, and projecting devices, using and guiding combined and then separated portions of web 11, 12. According to one aspect of the invention this web itself, and the separated portions thereof, can be considered as an operative although expendable portion of the new apparatus. The "negative" carbon film and the paper, as well as other elements mentioned in this outline, are of course old and simple by themselves. However, by virtue of the new machine arrangement, as described herein, it has become possible to do vastly more than the combining of recording and projecting operations of limited effectiveness, which had been provided in the past; the new system provides a distinct improvement in quality of the results furnished by the combined recorder and projector.

Particular difficulty had heretofore been encountered when an attempt was made to project multiple data, as in FIGURES 6 and 7 hereof, by means of such combined recorder projectors as were available. As the employment of "positive" films was usual, particularly in combination machines, the background light from one projector made it substantially impossible to obtain projection, with any satisfactory degree of contrast, of data provided by a second or third projector. The background light projected by any one of the machines caused too much dilution and washing out of the image projected by another of said machines. The difficulty was most serious when projection in daylight was attempted.

The new system, by contrast, lends itself admirably to the projection of data by one, two or more projectors focussed upon a single screen, in daylight or in the absence thereof, whereby it greatly extends the field of application and use of systems of the illustrated type, while at the same time simplifying the system in that the carbon film is used not only as a transfer medium for preparation of a permanent record but also as a "negative" projection medium. It will be realized, on consideration of FIGURE 7, that each light cone 24, 24' etc., as produced by "negative film" projection in this system, normally applies sharply outlined, limited characters to screen S, as suggested by letter A in FIGURE 6, which are clearly distinguishable even when another projector and light cone simultaneously projects graphic data such as the line A–B shown in FIGURE 4, which line may represent for instance the contours of a map, or the direction of flight of a plane or missile, or the like. No significant, mutual disturbance takes place as a result of such simultaneous projections, as provided hereby, in contrast to the above-mentioned operation of earlier systems of this kind which have led to mutual dilution and optical washing out of projected data.

While only a single embodiment of the invention has been described, it should be understood that the details thereof are not to be construed as limitative of the invention except insofar as is consistent with the scope of the following claims.

I claim:

1. In a recording and projecting system of the type wherein a strip of transparent film, coated with opaque material and laminated with paper, is guided past a recording device for forming a record on the paper by transferring said opaque material from limited areas of said film to said paper, the improvement which comprises means for separating said film and paper and for guiding thes separated film from adjacent said recording device over a predetermined path; a projector adjacent said path and on one side thereof for directing a cone of light through the negative record formed on said film by said transferring of opaque material; a screen opposite said projector and on the other side of said path for viewing said negative record; and means for guiding the separated paper over another path, remote from said cone of light, to a region for storage of the record formed on the paper.

2. Apparatus for recording and projecting data, comprising means defining a branched path for strip material including a record sheet with opaquely coated transparent film sheet overlying it; means for feeding such material along said path; scribing means adjacent said path for transferring opaque substance from portions of said coated film sheet to said record sheet; means for separately withdrawing said film sheet and said record sheet from said scribing means and for guiding them, respectively, along first and second branches of said path; a projector on one side of said first branch; a screen on the other side thereof for viewing the record formed on the film sheet by said transferring of opaque substance; and means disposed in said second branch and spaced from said projector and screen for receiving the record sheet and storing it.

References Cited by the Examiner

UNITED STATES PATENTS

| | | | |
|---|---|---|---|
| 1,319,820 | 10/19 | Williams | 88—24 |
| 1,794,147 | 2/31 | Chidester | 88—24 |
| 1,806,452 | 5/31 | Fulgora | 88—24 |
| 3,042,919 | 7/62 | Simjian | 346—22 |

LEO SMILOW, *Primary Examiner.*

EMIL G. ANDERSON, *Examiner.*